United States Patent
Uchikawa (10) Patent No.: US 10,057,233 B2
(45) Date of Patent: *Aug. 21, 2018

(54) IMAGE PROCESSING APPARATUS, METHOD FOR CONTROLLING THE SAME, AND STORAGE MEDIUM FOR CARRYING OUT LOGIN PROCESSING

(71) Applicant: CANON KABUSHIKI KAISHA, Tokyo (JP)

(72) Inventor: Hiroshi Uchikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,964

(22) Filed: Jan. 9, 2017

(65) Prior Publication Data

US 2017/0118191 A1   Apr. 27, 2017

Related U.S. Application Data (63) Continuation of application No. 13/682,662, filed on Nov. 20, 2012, now Pat. No. 9,576,118.

(30) Foreign Application Priority Data

Nov. 25, 2011   (JP) .................................. 2011-257628

(51) Int. Cl.
| | |
|---|---|
| *G06F 21/31* | (2013.01) |
| *H04L 29/06* | (2006.01) |
| *H04N 1/00* | (2006.01) |
| *H04N 1/44* | (2006.01) |

(52) U.S. Cl.
CPC ......... *H04L 63/08* (2013.01); *H04N 1/00408* (2013.01); *H04N 1/00506* (2013.01); *H04N 1/4433* (2013.01); *H04N 2201/0094* (2013.01)

(58) Field of Classification Search
USPC ...................................... 358/1, 1.15
See application file for complete search history.

(56) References Cited

U.S. PATENT DOCUMENTS

| | | | | |
|---|---|---|---|---|
| 2007/0229874 | A1* | 10/2007 | Hamada | G06F 3/1219 358/1.14 |
| 2009/0237699 | A1* | 9/2009 | Umezawa | H04N 1/32545 358/1.13 |
| 2011/0164269 | A1* | 7/2011 | Kamishiro | G06F 21/31 358/1.13 |

* cited by examiner

*Primary Examiner* — Jeffrey Pwu
*Assistant Examiner* — Samuel Ambaye
(74) *Attorney, Agent, or Firm* — Canon U.S.A., Inc. IP Division (57) ABSTRACT

An image processing apparatus transmits, after reception of a login notification of an authenticated user, the login notification to an identified application, and then changes displaying of a screen of a display unit to displaying of an initial screen corresponding to the identified application. After the displaying of the display unit has been changed to the displaying of the initial screen, the image processing apparatus transmits the login notification to, among applications belonging to a first group, an application to which the login notification has not been transmitted, and applications belonging to a second group.

19 Claims, 9 Drawing Sheets

IMAGE PROCESSING APPARATUS, METHOD FOR CONTROLLING THE SAME, AND STORAGE MEDIUM FOR CARRYING OUT LOGIN PROCESSING

CROSS-REFERENCE TO RELATED APPLICATIONS

This application is a continuation, and claims the benefit, of U.S. patent application Ser. No. 13/682,662 filed Nov. 20, 2012 (now U.S. Pat. No. 9,576,118), which claims the benefit of Japanese Patent Application No. 2011-257628 filed Nov. 25, 2011. Each of U.S. patent application Ser. No. 13/682,662 and Japanese Patent Application No. 2011-257628 is hereby incorporated by reference herein in its entirety.

BACKGROUND OF THE INVENTION

Field of the Invention

The present invention relates to an image processing apparatus that carries out login processing, a method for controlling the image processing apparatus, and a storage medium.

Description of the Related Art

In a recent image processing apparatus such as a multi-function peripheral, a function of limiting access to jobs or resources according to a user who has logged in, and a personalization function constituting a screen based on information of the user who has logged in have greatly grown in importance.

According to one of such image processing apparatuses, session management concerning the user is carried out in such a manner that the user inputs his own user name and password, logs in after authentication and approval in a user management system, and then logs out at the end of utilization by the user. During the session, the image processing apparatus controls access based on approval information of the user who has logged in, and personalizes an operation screen and an operation method.

There have been offered some methods for such session management of users. Japanese Patent Application Laid-Open No. 2007-28202 discusses a method for displaying a dedicated screen when the authenticated user is weak-sighted. Japanese Patent Application Laid-Open No. 2009-75451 discusses a method for reading customized information of the authenticated user and displaying a customized screen.

In an image processing apparatus installed in an office to be shared, quick logging-in to perform a predetermined operation is important. Even if the time for logging-in takes some seconds, convenience of users is reduced. It is, therefore, desired to set the logging-in time as short as possible.

SUMMARY OF THE INVENTION

The present invention is directed to a mechanism capable of displaying a screen adapted to an image processing function registered by an authenticated user after user authentication and before completion of transmission of a login notification to each application.

According to an aspect of the present invention, an image processing apparatus for executing a plurality of applications includes a registration unit configured to register one selected from the plurality of applications as an application concerning a screen displayed according to user's logging-in, a reception unit configured to receive user's logging-in to the image processing apparatus, a login notification transmission unit configured to transmit a login notification to the plurality of applications after the logging-in has been received, a display unit configured to display a screen for executing the registered application in response to the transmission of the login notification to the application registered by the registration unit, and a control unit configured to inhibit a screen change from the screen for executing the application registered by the registration unit to a screen for executing, among the plurality of applications, an application to which the login notification has not been transmitted.

According to another aspect of the present invention, there is provided an image processing apparatus having a first execution environment that is an operating system of the image processing apparatus and a second execution environment realized by a virtual machine operated in the first execution environment. The image processing apparatus includes a registration unit configured to register one selected from the plurality of applications operated in the first or second execution environment as an application concerning a screen displayed according to user's logging-in, a reception unit configured to receive user's logging-in to the image processing apparatus, a determination unit configured to transmit a login notification to the applications operated in the second execution environment after the logging-in has been received and then determine in which of the first execution environment and the second execution environment the application registered by the registration unit is operated, a display unit configured to display, when the determination unit determines that the registered application is operated in the first execution environment, a screen for executing the registered application in response to the transmission of the login notification to the registered application, and a control unit configured to inhibit a screen change from the screen for executing the application registered by the registration unit to a screen for executing, among the applications in the first execution environment, an application to which the login notification has not been transmitted.

According to an exemplary embodiment of the present invention, a screen adapted to the image processing function registered by the authenticated user can be displayed after the user authentication and before the completion of transmission of the login notification to each application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
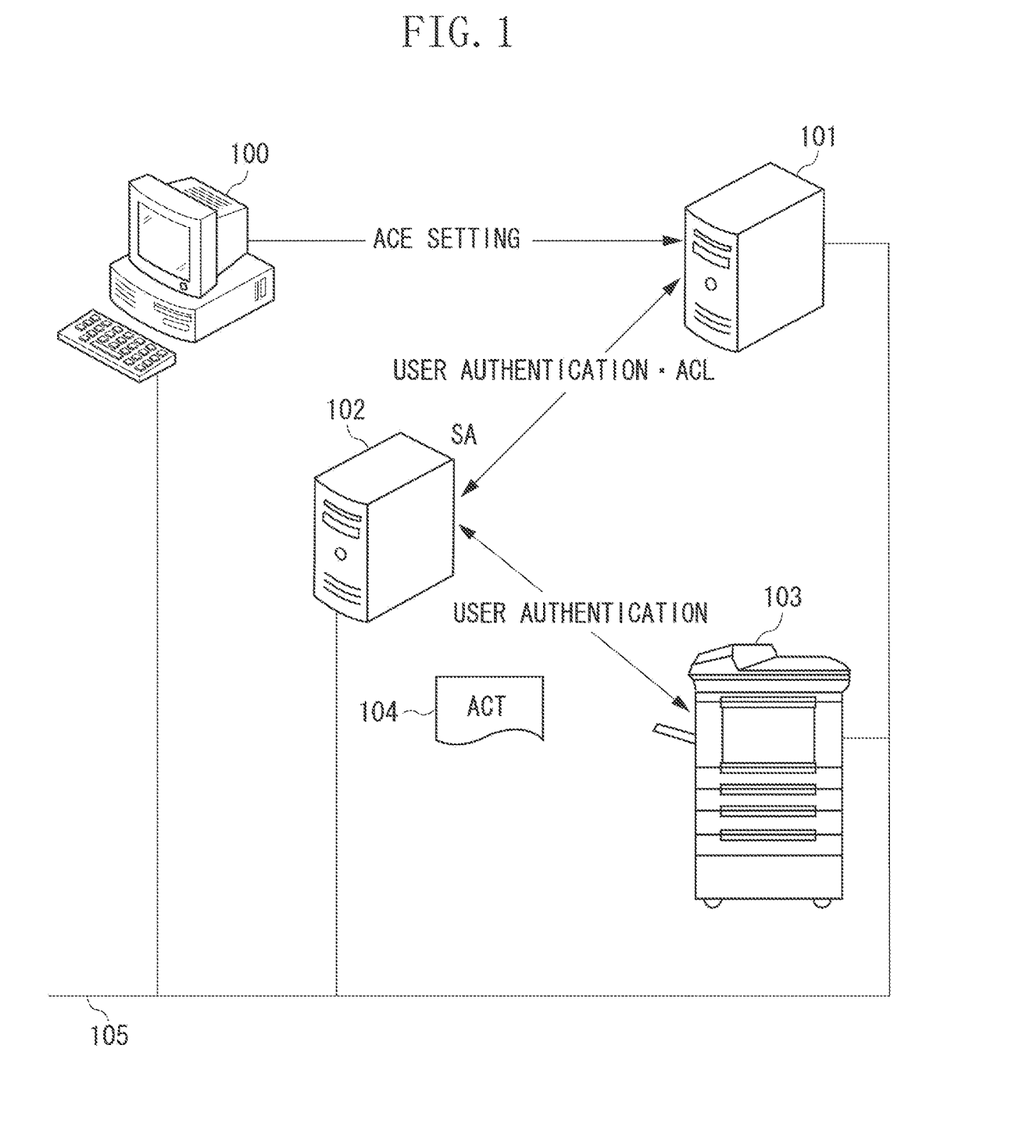
FIG. 1 illustrates a data processing system including an image processing apparatus according to an exemplary embodiment.

FIG. 1 illustrates an example of a data processing system including an image processing apparatus according to the present exemplary embodiment.

In this exemplary system, an information processing apparatus, a server apparatus, and an image processing apparatus are connected via a network to be able to communicate. Image processing executable in the image processing apparatus according to the present exemplary embodiment includes copying processing, data transmission processing, and image data transmission-reception processing. However, the image processing is not limited to these. Display processing executable in the image processing apparatus according to the present exemplary embodiment includes menu screen display processing and browser screen display processing. However, the display processing is not limited to these.

In FIG. 1, a client personal computer (PC) 100 (hereinafter, AU 100), in which a system administrator utility operates, sets and manages this system. Especially, an image processing apparatus 101 (hereinafter, DS 101) sets function limitation information (hereinafter, ACE) for limiting one among a plurality of executable image processing functions for each user or group.

The DS 101 functions as a user information server. Specifically, the DS 101 stores, in a hard disk described below, user information such as a user ID or a password and a function limitation information list (hereinafter, ACL) that is a set of ACEs indicating which of the functions is permitted to be used for each user or each image processing apparatus in the system.

The DS 101 is configured by using, for example, a lightweight directory access protocol (LDAP) server using LDAP or an active directory server manufactured by Microsoft Corporation.

A server apparatus (SA) 102 functioning as a ticket issuance server issues a ticket describing information about a usable function based on the ACL stored in the DS 101. The ticket will be described below.

An image processing apparatus 103 executes multifunctional data processing including a copying function, a printing function, a facsimile communication function, and a data communication function. Specifically, the image processing apparatus 103 has not only a function of copying a paper document but also a function of printing print data transmitted from an external printer driver.

The image processing apparatus 103 also has a function of reading the paper document and of transmitting its image data to an eternal file server or an e-mail address (SEND function). Further, the image processing apparatus 103 has a function of transmitting data to another image processing apparatus to print it at the image processing apparatus of the transmission destination (remote copying function or facsimile function).

The image processing apparatus 103 includes an operation unit described below, and provides various user interfaces to a user to execute login processing or image processing.

An access control token (ACT) 104 includes information about a function executable in the image processing apparatus 103 by a user who has logged in, or function limitation information to the image processing apparatus 103. A notification of the ACT 104 including such information is transmitted from the SA 102 to the image processing apparatus 103 via a network 105. Each application in the image processing apparatus controls the right of function utilization according to a login notification including the ACT 104 received from the SA 102.

The image processing apparatus 103 is connected from the AU 100 via the network 105 based on Ethernet (registered trademark), which is only an example of the system. The AU 100, the DS 101, and the SA 102 except for the image processing apparatus 103 can be all included in an identical computer. Further, the AU 100, the DS 101, and the SA 102 can be mounted in the image processing apparatus 103 so that the system can include only the image processing apparatus 103.

Figure 2:
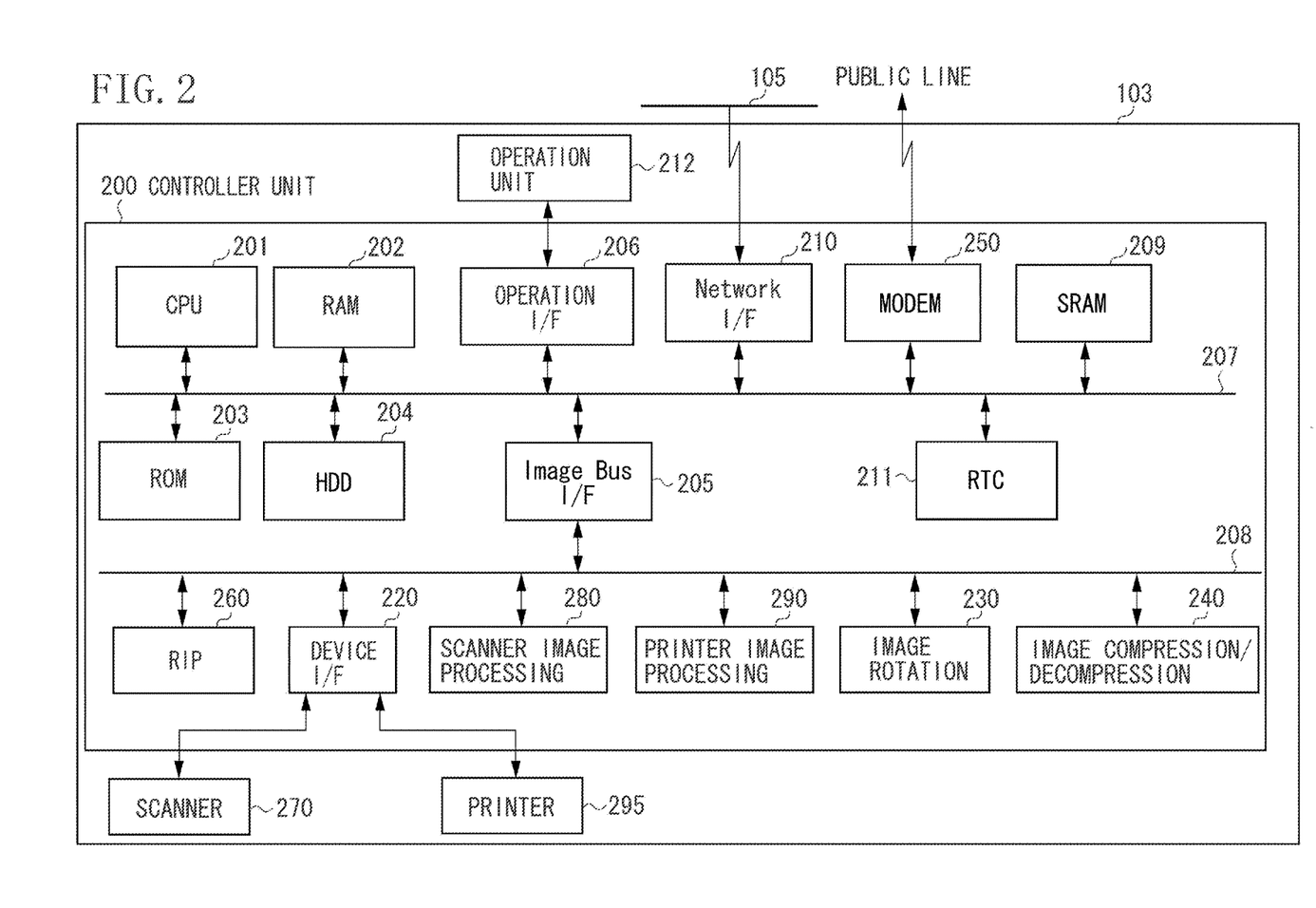
FIG. 2 is a block diagram illustrating a configuration of the image processing apparatus illustrated in FIG. 1.

FIG. 2 is a block diagram illustrating a configuration of the image processing apparatus 103 illustrated in FIG. 1.

In FIG. 2, a controller unit 200 is connected to a scanner 270 serving as an image input device, a printer 295 serving as an image output device and to the network 105, and a public line to input or output image information or device information.

A central processing unit (CPU) 201 is a controller for controlling the image processing apparatus 103. A random access memory (RAM) 202, which is a work memory for operating the CPU 201, is an image memory for temporarily storing image data. A read-only memory (ROM) 203 is a boot ROM for storing a boot program of the system. A hard disk drive (HDD) 204 stores system software, an application, the image data, and the ACT 104.

An operation interface (I/F) 206, which is an interface with an operation unit 212 including a touch panel, outputs the image data to be displayed on the operation unit 212 to the operation unit 212. The operation unit 212, which includes a display unit, is configured to display various user interface screens (UI screens).

The operation I/F 206 transmits information input from the operation unit 212 by the user of the system to the CPU 201. A network I/F 210 is connected to the network to input or output information. A modem 250 is connected to the public line to input or output information.

A static RAM (SRAM) 209 is a nonvolatile recording medium operable at a high speed. A real time clock (RTC) 211 executes processing for continuously counting current time even in a power-OFF state of the controller unit 200. These devices are arranged on a system bus 207.

An image bus I/F 205 is a bus bridge for connecting the system bus 207 to an image bus 208 for transferring the image data at a high speed to convert a data structure. The image bus 208 includes a protocol control information (PCI) bus or Institute of Electrical and Electronics Engineers (IEEE) 1394.

Following devices are arranged on the image bus 208.

A raster image processor (RIP) 260 rasterizes a page-description language (PDL) code into a bitmap image. A device I/F 220 connects the scanner 270 and the printer 295, which are the image input-output devices, to the controller unit 200 to synchronously or asynchronously convert the image data. A scanner image processing unit 280 corrects, processes, or edits the input image data. A printer image processing unit 290 executes printer correction or resolution conversion for print output image data. An image rotation unit 230 rotates the image data. An image compression/decompression unit 240 executes compression or decompression processing.

Figure 3:
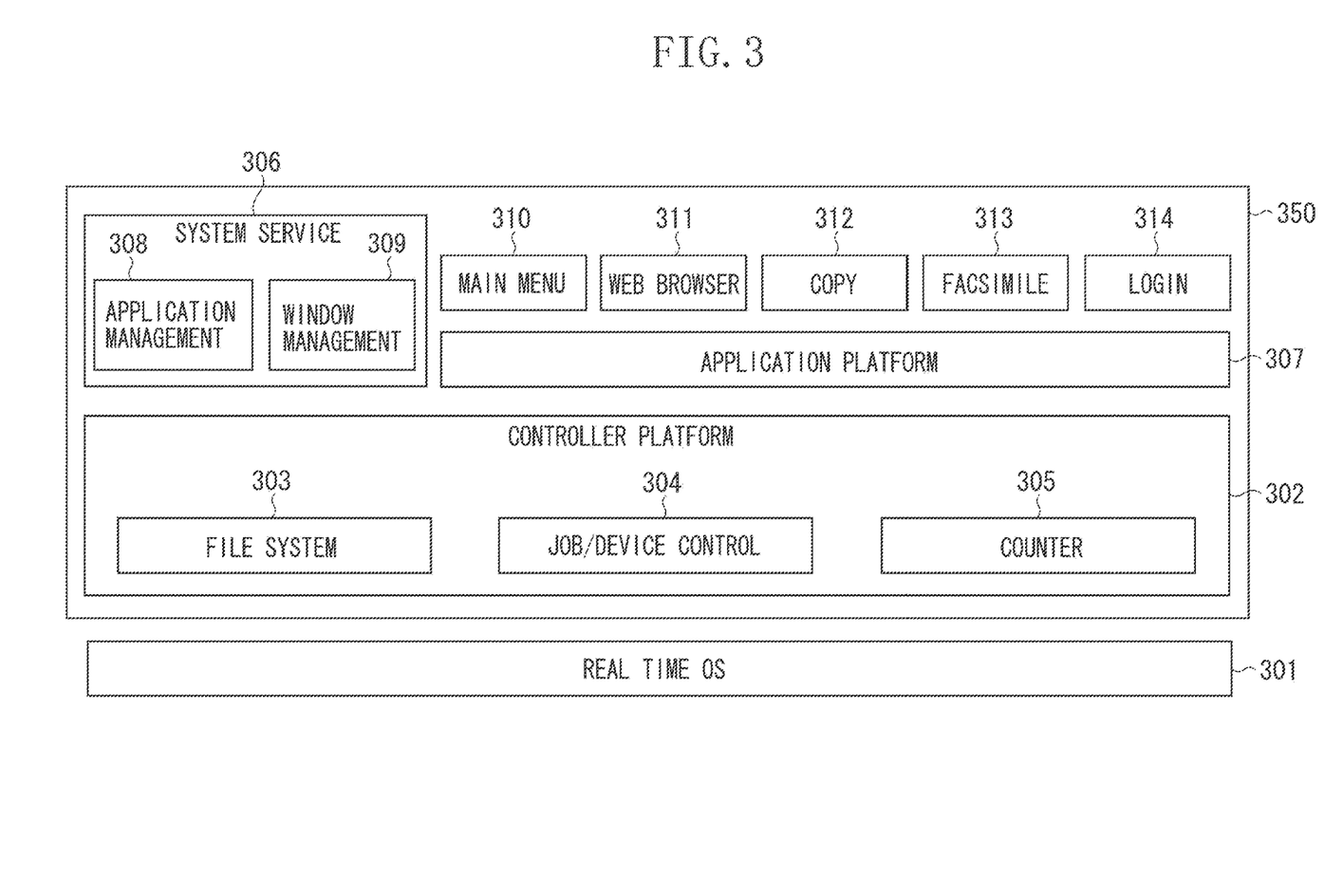
FIG. 3 is a block diagram illustrating a software configuration of the image processing apparatus.

FIG. 3 is a block diagram illustrating a software configuration of the image processing apparatus 103 according to the present exemplary embodiment.

Each software (module) described below is stored as firm software in the HDD 204 of the image processing apparatus 103, and read to the RAM 202 to be executed by the CPU 201. Further, each software is stored as firmware 350 in the HDD 204 of the image processing apparatus 103, and read to the RAM 202 to be executed by the CPU 201.

In FIG. 3, a real time operating system (OS) 301 provides various resource management services and a framework optimized for controlling a built-in system for software operated thereon.

The various resource management services and the framework provided by the real time OS include multitask (thread) management for managing a plurality of processing execution contexts by the CPU to operate a plurality of processes substantially in parallel, and intertask communication for realizing synchronization or data exchange between tasks. They further include memory management, interruption management, and a protocol stack in which various protocol processes such as various device drivers, a local interface, a network or communication are mounted.

A controller platform 302 includes a file system. 303, job-device control 304, and a counter 305.

The file system 303 is a mechanism configured in a storage device such as the HDD 204 or the RAM. 202 to store data. The job-device control 304 controls hardware of the image processing apparatus 103 and a job that utilizes basic functions (printing, scanning, communication, and image conversion) mainly provided by the hardware of the image processing apparatus 103. The counter 305 manages an expiration date of each application and counter values of printing and scanning stored in the SRAM 209.

A system service 306 includes application management 308 and window management 309. The application management 308 is a management module for installing, uninstalling, starting, or stopping applications 310 to 314. The window management 309 is a management module for controlling a display order of application windows included in the applications 310 to 314.

An application platform 307 is middleware for utilizing the mechanisms of the real time OS 301 and the controller platform 302 from the applications 310 to 314.

The applications 310 to 314 are application software for realizing various business models by using functions provided by the application platform 307.

The application 310 has a menu function of selecting each application. The application 311 for a web browser provides a web browser function of browsing a web server.

The application 312 for copying provides a copying function of copying the paper document. The application 313 for a facsimile provides a facsimile function of transmitting data.

In the present exemplary embodiment, each application that has received the ACT 104 through the login notification executes screen generation processing according to the user who has logged in based on its information. In the present exemplary embodiment, the login notification includes the ACT 104 acquired from the SA according to user's logging-in. However, the login notification can include other information such as an ID or a password for identifying the user, or a login context indicating the success of logging-in.

As an example of a function limitation according to the login user, processing in the case of a limitation where the login user is inhibited from using the web browser, executing color copying, and manually inputting a facsimile number, will be described.

In this case, the application 310 for the main menu processes the menu function to inhibit the login user from selecting the unusable web browser. Specifically, an icon on the menu screen is shaded or not displayed to inhibit a transition of a screen for executing the application 311 for the web browser. The application 312 for copying executes processing to inhibit selection of any color copy button. The application 313 executes processing to inhibit input of a new facsimile number while permitting only selection from an address book.

The application 314 for logging-in is authentication software for authenticating the user. The application 314 displays a login screen for receiving logging-in to the image processing apparatus 103 on the operation unit 212. Then, the application 314 transmits a user name and a password that are input by the operation unit 212 to the SA 102, and executes login processing based on the authentication result. The application 314 displays an error when the authentication fails, and executes a series of processes after the authentication when the authentication succeeds.

Referring to FIGS. 4, 5A, 5B, and 6, a limitation method according to the first exemplary embodiment will be described.

Figure 4:
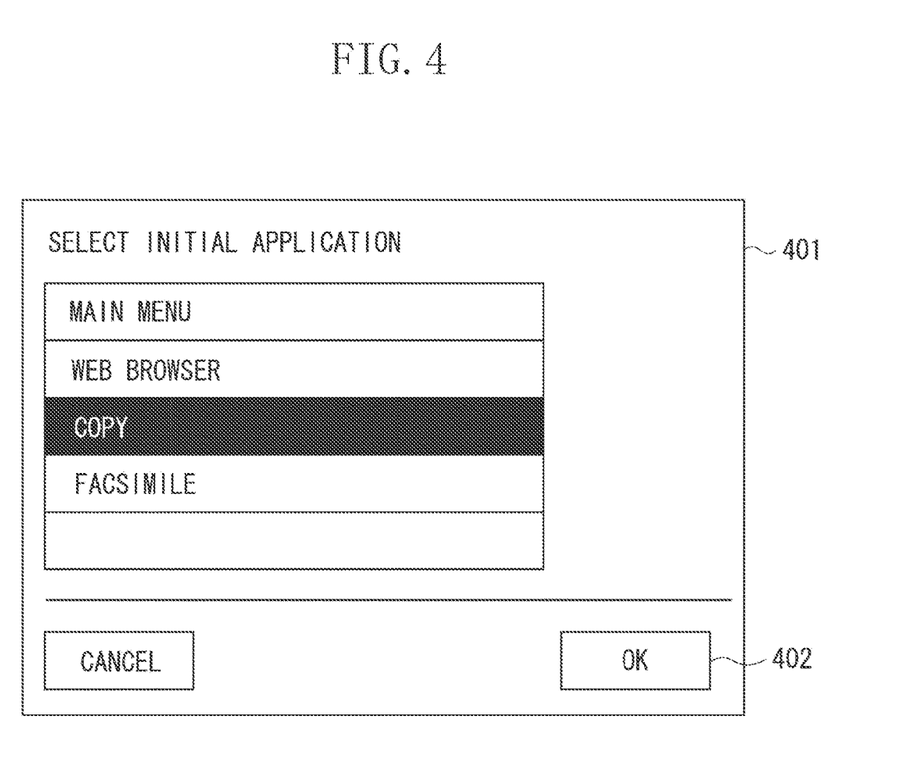
FIG. 4 illustrates an example of a user interface (UI) screen displayed in an operation unit illustrated in FIG. 2.

FIG. 4 illustrates an example of a UI screen displayed in the operation unit 212 illustrated in FIG. 2. This example corresponds to an initial application setting screen.

In FIG. 4, an initial application setting screen 401 is output from the window management 309 to the operation unit 212. The window management 309, which is stored as the firmware 350 in the HDD 204 of the image processing apparatus 103, is read to the RAM 202 to be executed by the CPU 201.

On the initial application setting screen 401, a list of applications registered in the window management 309 is displayed. An application is selected, and set as an initial application in the HDD 204 by pressing an OK button 402.

In the present exemplary embodiment, the initial application is an application selected, by the user, from the list of applications displayed on the screen illustrated in FIG. 4. The set application becomes a screen displaying a state where an application is selected for the first time after user authentication. Specifically, this is an example where after the user authentication, a copying selected state is displayed as an initial screen in the operation unit 212.

In the present exemplary embodiment, the initial screen is a screen to which a login screen is changed when logging-in is received via a screen (a login screen) used for the user to log in to the image processing apparatus.

Figure 5A:
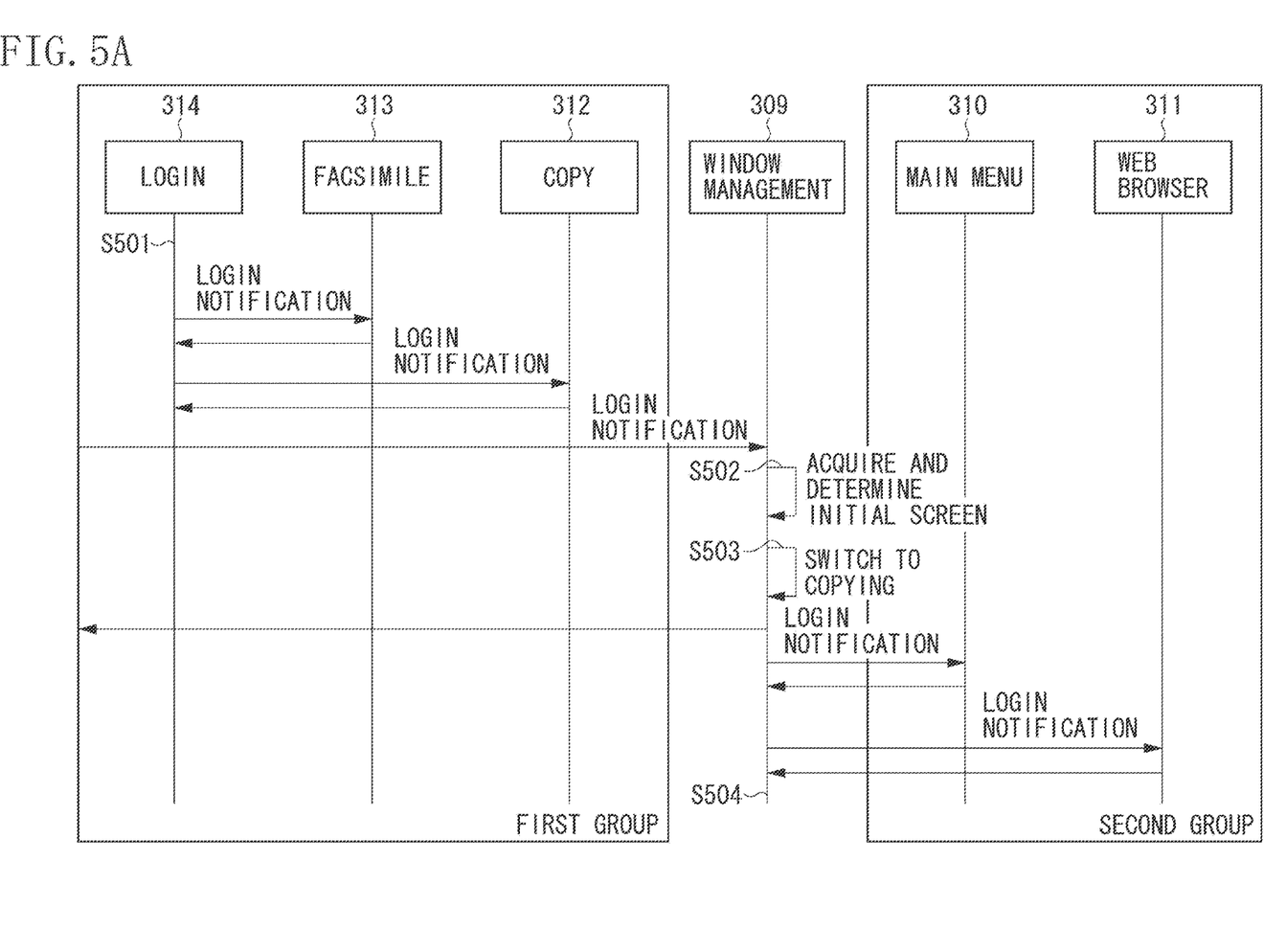
FIGS. 5A and 5B are sequence diagrams illustrating login processing in the image processing apparatus.
Figure 5B:
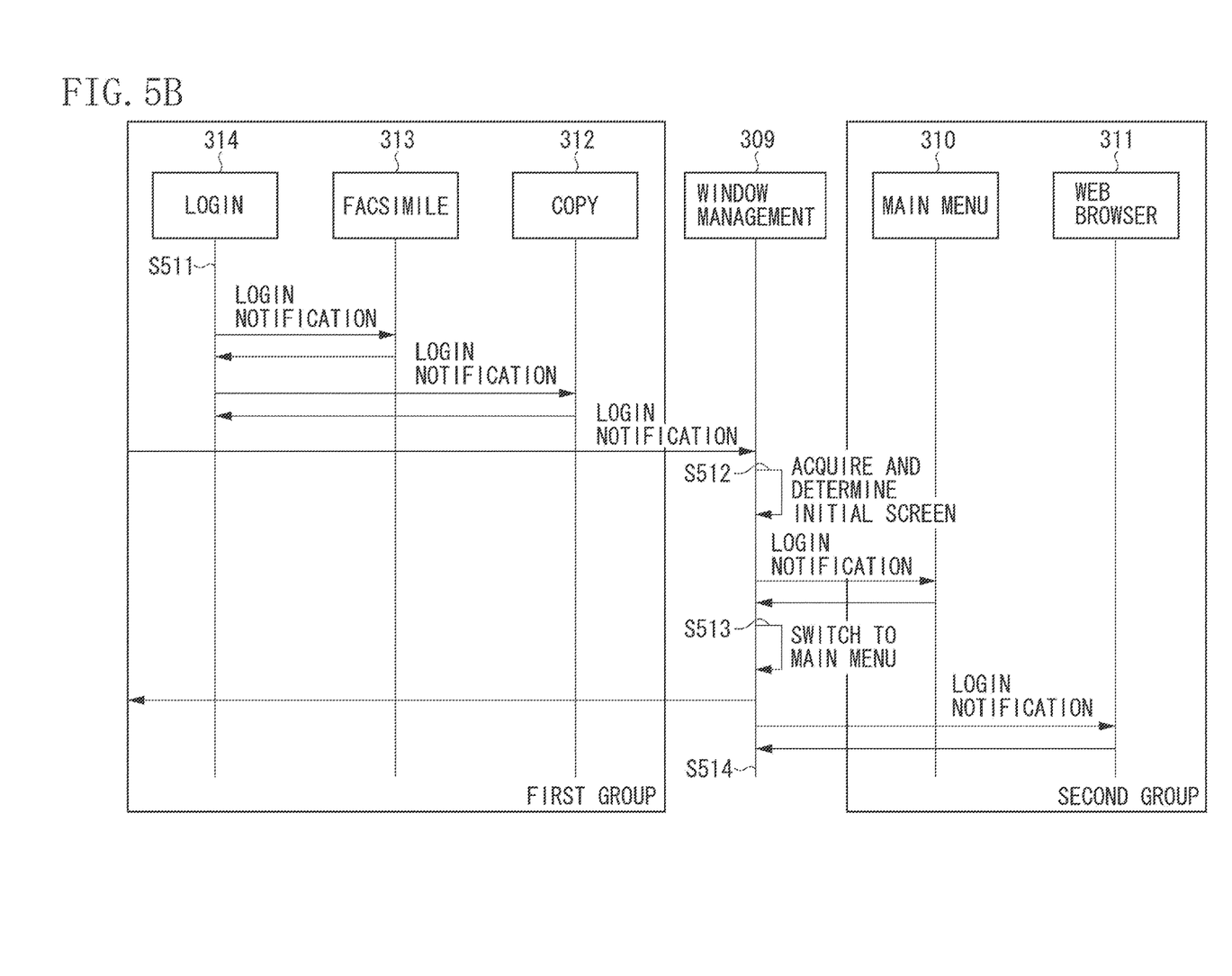

FIGS. 5A and 5B illustrate, respectively, a login processing sequence in the image processing apparatus according to the present exemplary embodiment.

Hereinafter, processing when the initial screen is displayed in the operation unit 212 after a registered user logs in and a login notification is transmitted to each application will be described in detail. In the present exemplary embodiment, the firmware 350 concerning the login processing is stored in the HDD 204 of the image processing apparatus 103, and read to the RAM 202 to be executed by the CPU 201.

As illustrated in FIG. 5A, in the first exemplary embodiment, the applications are divided into two groups, namely, a first group and a second group, to be managed according to execution environments and application characteristics.

The applications belonging to the first group are for executing image processing, and include the application 314, the application 313 for executing the facsimile function, and the application 312 for executing the copying function.

Similarly, the applications belonging to the second group are for executing display processing, and include the application 310 for displaying the main menu and the application 311 for executing the web browser.

When the application belonging to the first group needs a login notification, the application belonging to the first group and needing the login notification must register a login notification event in the application 314 for logging-in.

When the application belonging to the second group needs a login notification, the application belonging to the second group and needing the login notification must register a login notification event in the window management 309.

The application 314 for logging-in transmits the login notification to the application belonging to the first group, while the window management 309 transmits the login notification to the application belonging to the second group. In other words, main units (applications) that transmit the login notification are different between the first group and the second group.

The application 314 for logging-in is configured beforehand to transmit the login notification to the window management 309.

FIG. 5A illustrates a sequence when the initial screen is set in the application 314 for logging-in on the initial application setting screen illustrated in FIG. 4. Processing of steps S501 to S504 will now be described.

In FIG. 5A, in step S501, after reception of user's logging-in to the image processing apparatus 103, the application 314 for logging-in transmits a login notification to all the applications belonging to the first group irrespective of which application has been set on the initial screen. Specifically, the application 314 for logging-in transmits the login notification to the facsimile application 313 and the copying application 312, both of which belong to the first group. Then, after completion of transmission of the login application to the applications belonging to the first group, the application 314 for logging-in transmits the login notification to the window management 309.

In step S502, the window management 309 acquires the initial screen setting set in FIG. 4, and determines whether the initial screen is the application belonging to the first group or the application belonging to the second group. This determination is for judging whether the login notification has been transmitted to the application set on the initial screen when the window management 309 receives the logion notification.

In FIG. 5A, the initial screen is the copying application 312 (i.e., the application belonging to the first group). Thus, in step S503, the window management 309 changes the screen of the application 314 to the screen of the application 312. At this time, transmission of the login notification to the application 310 for the main menu and the application 311 for the web browser is not completed yet.

Thus, the present exemplary embodiment is advantageous in that the initial screen can be displayed before the login notification is transmitted to all the applications, and the time until the display of the initial screen after the logging-in can be shortened.

However, when the initial screen is displayed before the login notification is transmitted to all the applications as in the case of the present exemplary embodiment, the following situation may occur. That is, the user may instruct a screen transition to another screen (e.g., a screen displayed by the application 310 for the main menu or the application 311 for the web browser) after the initial screen has displayed.

Accordingly, the window management 309 inhibits the screen from changing to an application that has not received the login notification yet, namely, the application 310 for the main menu or the application 311 for the web browser. This is protection processing for preventing any screen not based on information of the logged in user from being displayed, due to the screen transition of an application that has not received the login notification yet.

Then, the window management 309 transmits the login notification to the application 310 for the main menu and the application 311 for the web browser. Then, in step S504, the window management 309 permits changing to the screen of the application 310 for the main menu or the application 311 for the web browser.

FIG. 5B illustrates an example of a sequence when an initial screen is set in the application 310 for the main menu on the initial application setting screen illustrated in FIG. 4.

In step S511, after detection of user's logging-in, the application 314 transmits a login notification to the window management 309 in the same sequence as that illustrated in FIG. 5A. In step S512, the window management 309 executes determination similar to that of step S502.

In this sequence, since the initial screen is set in the application 310 for the main menu, the window management 309 transmits the login notification to the application 310 for the main menu. Then, in step S513, the window management 309 changes the screen of the application 314 for logging-in to that of the application 310 for the main menu.

At this time, transmission of the login notification to the application 311 for the web browser is yet to be completed. Thus, the window management 309 inhibits screen changing to the application 311 for the web browser. Then, the window management 309 transmits the login notification to the application 311 for the web browser. Then, in step S514, the window management 309 permits changing to the screen of the application 311 for the web browser.

Figure 6:
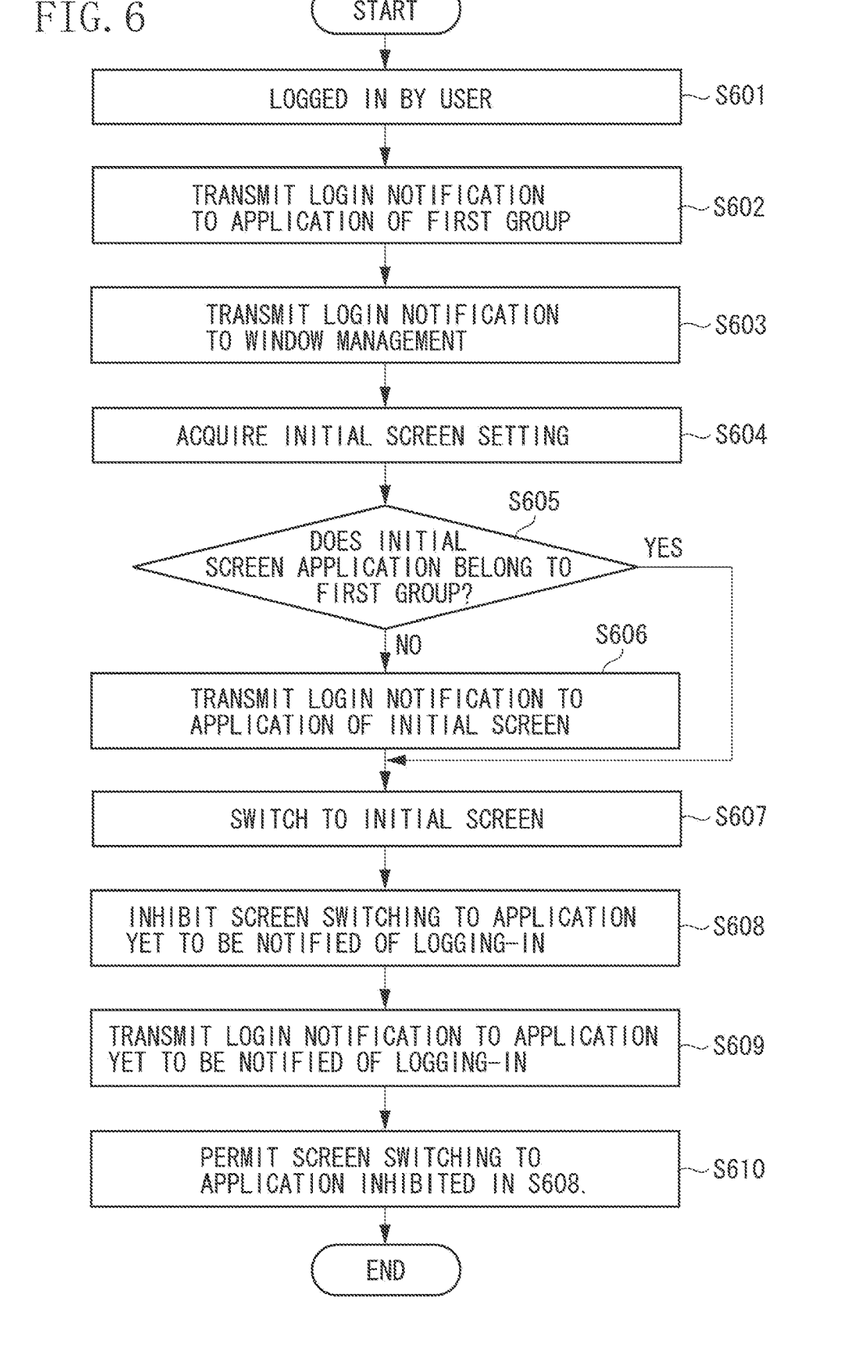
FIG. 6 is a flowchart illustrating a control method of the image processing apparatus.

FIG. 6 is a flowchart illustrating a control method of the image processing apparatus according to the present exemplary embodiment.

This example corresponds to the login processing example of the image processing apparatus 103. The firmware 350 concerning the login processing according to the present exemplary embodiment is stored in the HDD 204 of the image processing apparatus 103, and read to the RAM 202 to be executed by executing one step by the CPU 201. A main unit will be described as a corresponding application.

Hereinafter, in the present exemplary embodiment, an example where a specific application belonging to the first group and registered by the user is the application 312 for executing image processing corresponding to a copying function will be described. However, the application can be the application 313.

In step S601, the application 314 detects logging-in. Then, in step S602, the application 314 transmits a login notification to the application of the first group. In step S603, the application 314 transmits the login notification to the window management 309.

In step S604, the window management 309 acquires initial screen setting. In step S605, the application of the initial screen determines whether the application belongs to the first group. This determination is executed by the procedure of step S502. Specifically, the window management 309 has an identifier of the application and registration as to which group the application belongs received at the time of starting each application, and executes the determination based on this information.

When the window management 309 determines that the application does not belong to the first group (NO in step S605), the processing proceeds to step S606 to transmit the login notification to the application of the initial screen. Then, the processing proceeds to step S607.

On the other hand, when the window management 309 determines that the application belongs to the first group (YES in step S605), the processing directly proceeds to step S606.

In step S607, the window management 309 changes the screen to the initial screen. In step S608, the window management 309 inhibits screen changing to an application yet to receive the login notification.

In step S609, the window management 309 transmits the login notification to the application yet to receive the login notification. In step S610, the window management 309 permits screen changing to the application to which the screen changing has been inhibited in step S608 to end this processing.

According to the present exemplary embodiment, when the login notification has been transmitted to the application of the initial screen, the initial screen can be displayed before completion of the entire login sequence. As a result, the logging-in time can be shortened while configuring a correct screen based on information of the login user for each logging-in.

The present exemplary embodiment has been described assuming that the application for executing the image processing belongs to the first group and the application for executing the display processing belongs to the second group. However, in addition to this division of applications, the applications can be divided between the first group and the second group according to which software execution environments (operation environments) the operations operate in.

More specifically, a JAVA® execution environment realized by a virtual machine is constructed as an execution environment for another included system on the real time OS 301 illustrated in FIG. 3. Then, applications operated on the real time OS 301 (first execution environment) are set as applications belonging to the second group and applications operated on the JAVA® execution environment (second execution environment) are set as applications belonging to the first group.

Specifically, the application 314 for logging-in, the application 312 for copying, and the application 314 for the facsimile are operated in the JAVA® execution environment. The application 311 for the web browser and the application 310 for the main menu are operated on the real time OS. A method for transmitting a login notification to the applications belonging to each group and screen display control to the initial screen are carried out based on the sequences described above referring to FIGS. 5A and 5B.

The group division based on the difference in execution environment between the applications to be executed provides the following effects.

In this case, it is presumed that the logging-in application for receiving user's logging-in operates in the JAVA® execution environment. The logging-in application operated in the JAVA® execution environment always transmits a login notification to the other applications similarly operated in the JAVA® execution environment irrespective of initial screen setting, and to the window management 309 operated on the real time OS 301. Thus, transfer of data (login notification) between a plurality of different software execution environments can be reduced to a minimum.

In the first exemplary embodiment, the timing of determining the initial screen setting is after the transmission of the login notification to the application of the first group. Thus, in the first exemplary embodiment, when the application set on the initial screen belongs to the second group, the time until the displaying of the initial screen can be shortened. However, in the first exemplary embodiment, when the application set on the initial screen belongs to the first group, the effect of time shortening cannot be provided, or limited.

Next, a second exemplary embodiment will be described. A basic configuration of an image processing apparatus according to the second exemplary embodiment is similar to that of the first exemplary embodiment illustrated in FIGS. 1 to 4. A feature of the second exemplary embodiment will be described.

Figure 7:
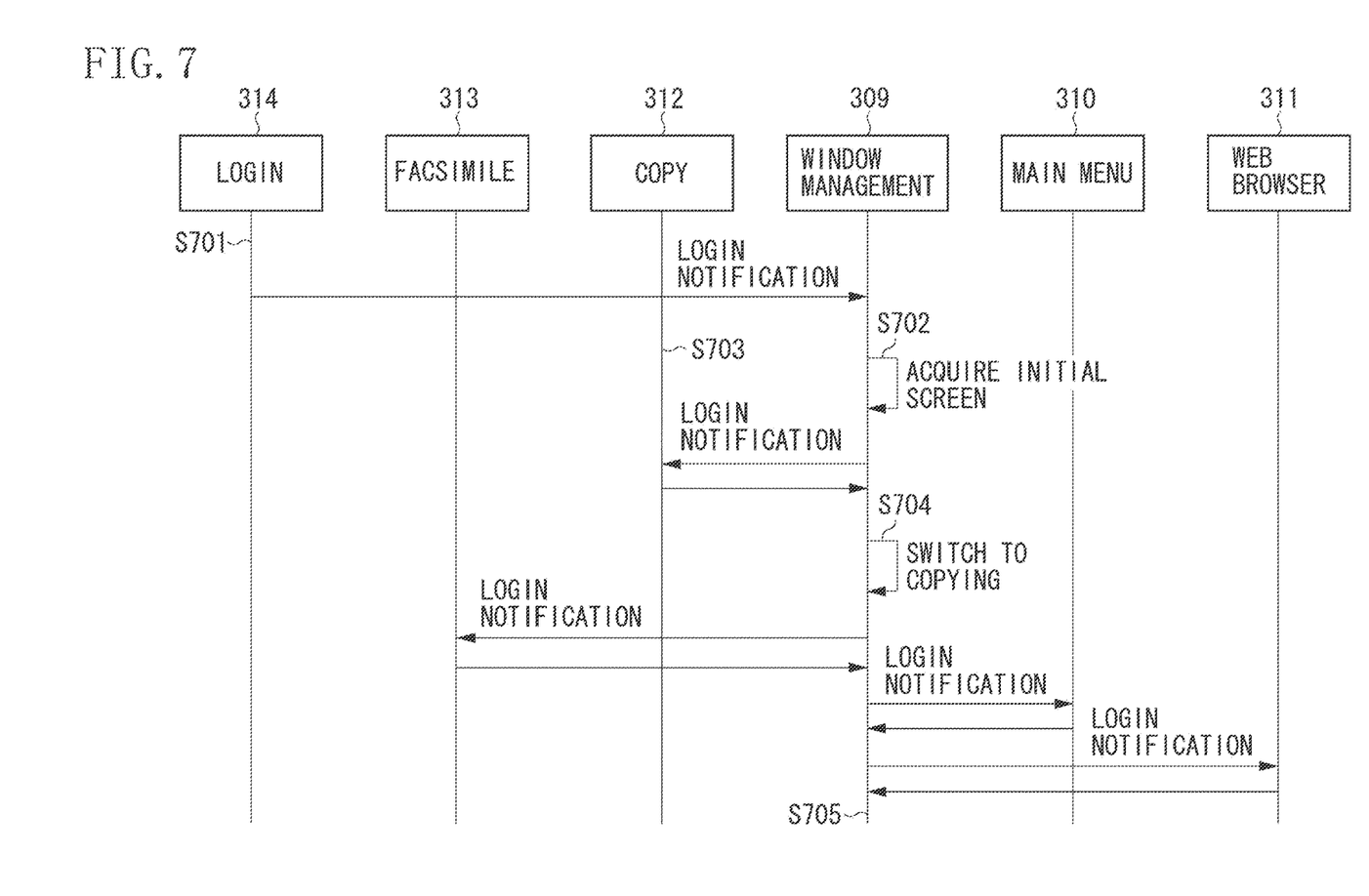
FIG. 7 is a sequence diagram illustrating login processing in the image processing apparatus.

FIG. 7 illustrates a login processing sequence in the image processing apparatus according to the present exemplary embodiment.

This is an example of a sequence when an initial screen is set in an application 312 copying on the initial application setting screen illustrated in FIG. 4. In the present exemplary embodiment, a firmware 350 concerning the login processing is stored in a HDD 204 of the image processing apparatus 103, and read to a RAM 202 to be executed by a CPU 201.

First, in step S701, after detection of user's logging-in, an application 314 transmits a login notification to a window management 309.

In step S702, the window management 309 acquires initial screen setting. In step S703, the window management 309 transmits the login notification to the application 312 for copying.

Then, in step S704, the window management 309 changes the screen of the application 314 to the screen of the application 312 for copying.

In other words, the second exemplary embodiment is different from the first exemplary embodiment in that after reception of user's logging-in, the application 314 for logging-in transmits the login notification not to the application 313 for the facsimile but to the window management 309.

The window management 309 transmits the login notification to an application (application 312 for copying in the example illustrated in FIG. 7) set on the initial screen, and controls displaying of the initial screen before transmission of the login notification to the other applications.

As a result, a higher speed can be achieved for the screen displaying irrespective of what type of application the application set on the initial screen is.

At the time of displaying the initial screen, transmission of the login notification to the applications other than the application 312 for copying is yet to be completed. Accordingly, the window management 309 inhibits screen changing to those other than that of the application 312 for copying.

Then, the window management 309 transmits the login notification to the application 313 for the facsimile, the application 310 for the main menu, and the application 311 for the web browser. Then, in step S705, the window management 309 permits screen changing to those other than the application 312 for copying.

Figure 8:
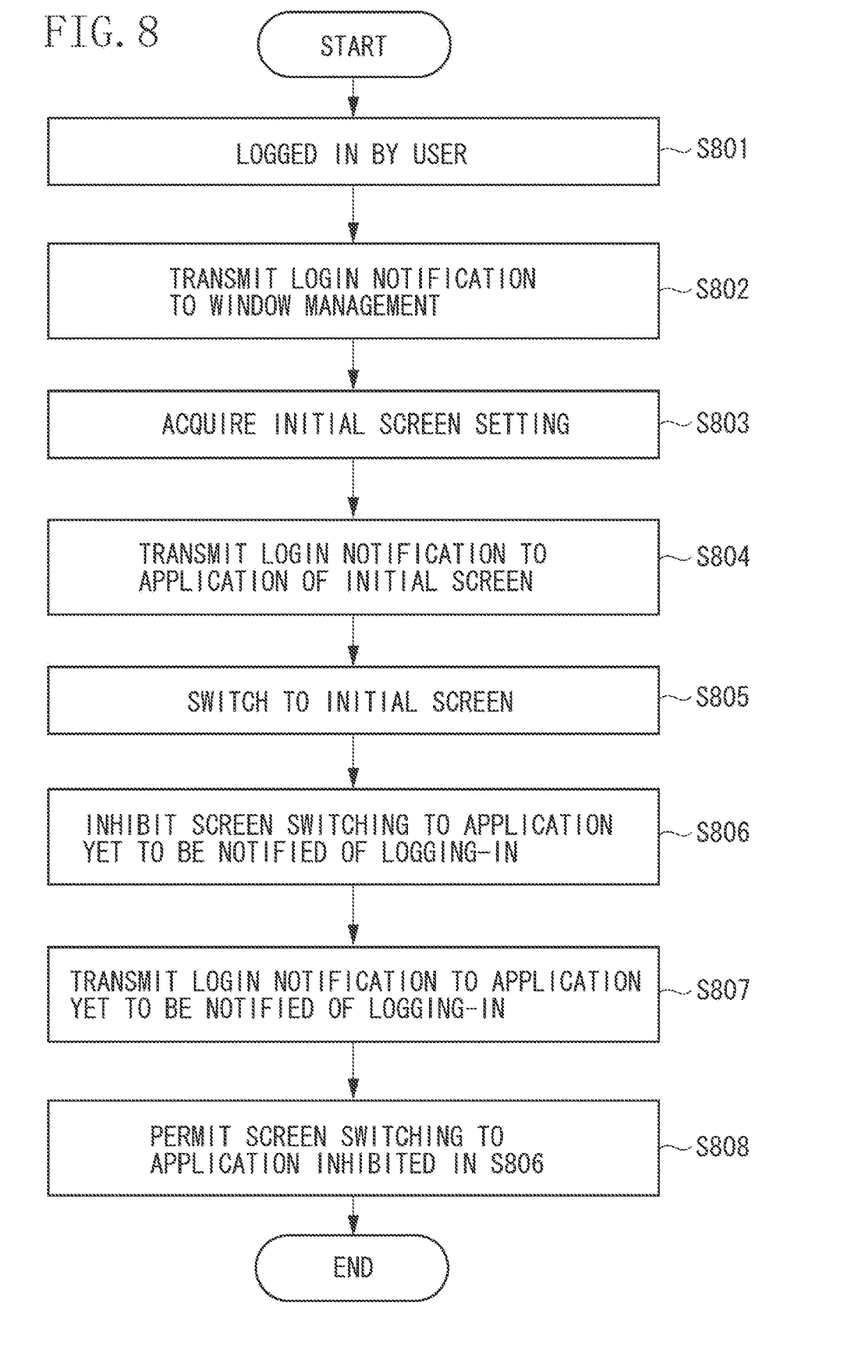
FIG. 8 is a flowchart illustrating a control method of the image processing apparatus.

FIG. 8 is a flowchart illustrating a control method of the image processing apparatus according to the present exemplary embodiment.

This example corresponds to the login processing example of the image processing apparatus 103. The firmware 350 concerning the login processing according to the present exemplary embodiment is stored in the HDD 204 of the image processing apparatus 103, and read to the RAM 202 to be executed by executing one step by the CPU 201. A main unit will be described as a corresponding application.

In step S801, the application 314 detects logging-in. Then, in step S802, the application 314 transmits a login notification to the window management 309. In step S803, the window management 309 acquires initial screen setting. In step S804, the application 314 transmits the login notification to the application of the initial screen (application 312 for copying in the example illustrated in FIG. 4).

In step S805, the window management 309 changes the screen to the initial screen. In step S806, the application 314 inhibits screen changing to applications yet to receive the login notification, namely, applications other than the application of the initial screen.

In step S807, the application 314 sequentially transmits the login notification to the applications yet to receive the login notification. Then, in step S808, the application 314 permits screen changing to the applications to which the screen changing has been inhibited in step S806.

According to the present exemplary embodiment, irrespective of groups, the login notification is first transmitted to the application of the initial screen, and the screen is changed. Thus, better effects can be provided.

Each process of the present exemplary embodiment can be realized by executing software (program) acquired via a network or various storage media by a processing apparatus (CPU or processor) such as a personal computer (computer).

The present invention is not limited to the exemplary embodiments. Various changes (including organic combinations of the exemplary embodiments) can be made based on the gist of the present invention, which are within the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A method for controlling an image processing apparatus having a plurality of applications including a first group of applications and a second group of applications, wherein each of applications belonging to the first group is operated on an execution environment realized by a virtual machine and each of applications belonging to the second group is operated on an operating system of the image processing apparatus, the method comprising:
    setting one of the plurality of applications as an application for an initial screen to be displayed according to user's logging-in to the image processing apparatus;
    accepting user's logging-in to the image processing apparatus;
    notifying, according to success of user's logging-in to the image processing apparatus, user identification information of a log-in user to each of the applications belonging to the first group among the plurality of applications, wherein each of the plurality of applications generates a screen to be displayed based on the user identification information,
    (i) in a case where the set one of the plurality of applications is included in the applications belonging to the first group, displaying, as the initial screen, the screen generated by the set one of the plurality of applications which has received the notified user identification information and notifying the user identification information to each of the applications belonging to the second group after displaying the initial screen,
    (ii) in a case where the set one of the plurality of applications is included in the applications belonging to the second group, notifying the user identification information to the set one of the plurality of applications and displaying, as the initial screen, the screen generated by the set one of the plurality of applications which has received the notified user identification information, and notifying the user identification information to each of the applications belonging to the second group other than the set one of the plurality of applications after displaying the initial screen.

2. The method according to claim 1, further comprising determining whether the user identification information has been notified to the set one of the plurality of applications,
    wherein the displaying displays, as the initial screen, the screen generated by the set one of the plurality of applications in a case where it is determined that the user identification information has been notified to the set one of the plurality of applications.

3. The method according to claim 1, wherein the second group of applications includes an application for displaying a menu screen.

4. The method according to claim 2, wherein the first group of applications includes a copying application or a data transmission application.

5. The method according to claim 1, further comprising inhibiting applications to which the user identification information has not been notified from changing screen from the initial screen.

6. The method according to claim 1, wherein, based on success of user's logging-in to the image processing apparatus, a login application belonging to the first group of applications notifies the user identification information to each of the applications belonging to the first group.

7. The method according to claim 6,
    wherein the login application notifies the user identification information to a window management module after the login application notifies the user identification information to each of the applications belonging to the first group, and
    wherein the window management module having been notified of the user identification information notifies the user identification information to each of the applications belonging to the second group.

8. The method according to claim 7,
    wherein the window management module obtains, based on reception of the user identification information having been notified, information indicative of the set one of the plurality of applications,
    wherein the window management module determines, based on the obtained information, whether the set one of the plurality of applications belongs to the first group of applications or to the second group of applications, wherein, in a case where it is determined that the set one of the plurality of applications belongs to the first group of applications, the window management module causes the screen generated by the set one of the plurality of applications to be displayed, and notifies the user identification information to each of the applications belonging to the second group after the screen has been displayed, wherein, in a case where it is determined that the set one of the plurality of applications belongs to the second group of applications, the window management module notifies the user identification information to the set one of the plurality of applications, causes the screen generated by the set one of the plurality of applications to be displayed, and notifies the user identification information to each of the applications belonging to the second group other than the set one of the plurality of application after the screen has been displayed.

9. An image processing apparatus having a plurality of applications including a first group of applications and a second group of applications, wherein each of applications belonging to the first group is operated on an execution environment realized by a virtual machine and each of applications belonging to the second group is operated on an operating system of the image processing apparatus, the image processing apparatus comprising:

at least one memory that stores a program of instructions; and at least one processor, coupled to the at least one memory, that executes the program of instructions to cause the image processing apparatus to implement:

a setting unit configured to set one of the plurality of applications as an application for an initial screen to be displayed according to user's logging-in to the image processing apparatus;

an accepting unit configured to accept user's logging-in to the image processing apparatus;

a notification unit configured to notify, according to success of user's logging-in to the image processing apparatus, user identification information of a log-in user to each of the applications belonging to the first group among the plurality of applications, wherein each of the plurality of applications generates a screen to be displayed based on the user identification information; and a control unit configured to, in a case where the set one of the plurality of applications is included in the applications belonging to the first group, display, as the initial screen, a screen generated by the set one of the plurality of applications which has received the notified user identification information and notify the user identification information to each of the applications belonging to the second group after the initial screen being displayed, and in a case where the set one of the plurality of applications is included in the applications belonging to the second group, notify the user identification information to the set one of the plurality of applications and display, as the initial screen, a screen generated by the set one of the plurality of applications which has received the notified user identification information, and notify the user identification information to each of the applications belonging to the second group other than the set one of the plurality of applications after the initial screen being displayed.

10. A non-transitory computer-readable storage medium storing a program that causes a computer to execute a method for controlling an image processing apparatus having a plurality of applications including a first group of applications and a second group of applications, wherein each of applications belonging to the first group is operated on an execution environment realized by a virtual machine and each of applications belonging to the second group is operated on an operating system of the image processing apparatus, the method comprising:

setting one of the plurality of applications as an application for an initial screen to be displayed according to user's logging-in to the image processing apparatus;

accepting user's logging-in to the image processing apparatus; and notifying, according to success of user's logging-in to the image processing apparatus, user identification information of a log-in user to each of the applications belonging to the first group among the plurality of applications, wherein each of the plurality of applications generates a screen to be displayed based on the user identification information, (i) in a case where the set one of the plurality of applications is included in the applications belonging to the first group, displaying, as the initial screen, the screen generated by the set one of the plurality of applications which has received the notified user identification information and notifying the user identification information to each of the applications belonging to the second group after displaying the initial screen, (ii) in a case where the set one of the plurality of applications is included in the applications belonging to the second group, notifying the user identification information to the set one of the plurality of applications and displaying, as the initial screen, the screen generated by the set one of the plurality of applications which has received the notified user identification information and notifying the user identification information to each of the applications belonging to the second group other than the set one of the plurality of applications after displaying the initial screen.

11. A method for controlling an image processing apparatus having a plurality of applications, the method comprising:

setting one of the plurality of applications as an application of an initial screen to be displayed according to user's logging-in to the image processing apparatus;

accepting user's logging-in to the image processing apparatus;

notifying, in response to success of user's logging-in to the image processing apparatus, user identification information of a log-in user to each of the plurality of applications, wherein each of the plurality of applications generates a screen to be displayed based on the notified user identification; and displaying an initial screen generated by one of the plurality of applications which is set by the setting as the application of the initial screen and has received the user identification information, wherein the initial screen is displayed in response to the user's logging-in being accepted, and the initial screen is displayed before completion of notification of the user identification information by the notifying to all the plurality of applications.

12. The method according to claim 11, wherein the notifying notifies the user identification information to the set one of the plurality of applications based on success of user's logging-in to the image processing apparatus, and
wherein the notifying notifies the user identification information to each of the plurality of applications other than the set one of the plurality of applications after the initial screen has been displayed.

13. The method according to claim 11, further comprising inhibiting a screen generated by an application that has not been notified of the user identification information from being displayed.

14. The image processing apparatus according to claim 11, wherein the plurality of applications includes an application for displaying a menu screen.

15. The image processing apparatus according to claim 11, wherein the plurality of applications includes a copying application or a data transmission application.

16. An image processing apparatus having a plurality of applications, the image processing apparatus comprising:
at least one memory that stores a program of instructions; and
at least one processor, coupled to the at least one memory, that executes the program of instructions to cause the image processing apparatus to implement:
a setting unit configured to set one of the plurality of applications as an application of an initial screen to be displayed according to user's logging-in to the image processing apparatus;
an accepting unit configured to accept user's logging-in to the image processing apparatus;
a notification unit configured to notify, in response to success of user's logging-in to the image processing apparatus, user identification information of a log-in user to each of the plurality of applications, wherein each of the plurality of applications generates a screen to be displayed based on the notified user identification information, and
a displaying unit configured to display an initial screen generated by one of the plurality of applications which is set by the setting as the application of the initial screen and has received the notified user identification information wherein the initial screen is displayed in response to the user's logging-in being accepted, and the initial screen is displayed before completion of notification of the user identification information by the notification unit to all the plurality of applications.

17. A non-transitory computer-readable storage medium storing a program that causes a computer to execute a method for controlling an image processing apparatus having a plurality of applications, the method comprising:
setting one of the plurality of applications as an application of an initial screen to be displayed according to user's logging-in to the image processing apparatus;
accepting user's logging-in to the image processing apparatus;
notifying, in response to success of user's logging-in to the image processing apparatus, user identification information of a log-in user to each of the plurality of applications, wherein each of the plurality of applications generates a screen to be displayed based on the notified user identification, and
displaying an initial screen generated by one of the plurality of applications which is set by the setting as the application of the initial screen and has received the user identification information wherein the initial screen is displayed in response to the user's logging-in being accepted, and the initial screen is displayed before completion of notification of the user identification information by the notifying to all the plurality of applications.

18. The method according to claim 11, information about the function executable in the image processing apparatus by the log-in user is notified to each of the plurality of applications in response to success of user's logging-in to the image processing apparatus.

19. The image processing apparatus according to claim 18, wherein the information about the function executable in the image processing apparatus by the log-in user is carried by an access control token (ACT).

* * * * *